United States Patent [19]

Turner

[11] Patent Number: 5,362,205
[45] Date of Patent: Nov. 8, 1994

[54] METHOD AND APPARATUS FOR SYNCHRONIZING THE SPEED AND PHASE OF PLURAL PROPELLERS OF AN AIRCRAFT

[76] Inventor: Gilbert A. Turner, 27 Great Norwood St., Cheltenham, Glos., GL50 2AW, United Kingdom

[21] Appl. No.: 847,006

[22] PCT Filed: Aug. 9, 1991

[86] PCT No.: PCT/GB91/00362
§ 371 Date: May 27, 1992
§ 102(e) Date: May 27, 1992

[87] PCT Pub. No.: WO92/02412
PCT Pub. Date: Feb. 20, 1992

[30] Foreign Application Priority Data
Aug. 10, 1990 [GB] United Kingdom ............ 9017599.3

[51] Int. Cl.⁵ ............................................. B64C 11/50
[52] U.S. Cl. ...................................... 416/34; 416/40; 364/571.07
[58] Field of Search ............................. 416/34, 35, 40; 364/431.02, 571.07

[56] References Cited

U.S. PATENT DOCUMENTS
4,569,021 2/1986 Larson et al. ................. 364/431.01

FOREIGN PATENT DOCUMENTS
0008584 3/1980 European Pat. Off. .

Primary Examiner—Edward K. Look
Assistant Examiner—Michael S. Lee
Attorney, Agent, or Firm—Young & Thompson

[57] ABSTRACT

A propeller control system (1) includes a propeller controller (6) the gain of which is set by a look up table (2) in response to airspeed data supplied by an airspeed detector (4). By varying the gain of the propeller controller (6) an overall system gain can be maintained as the gain of a propeller (7) varies with airspeed.

5 Claims, 2 Drawing Sheets

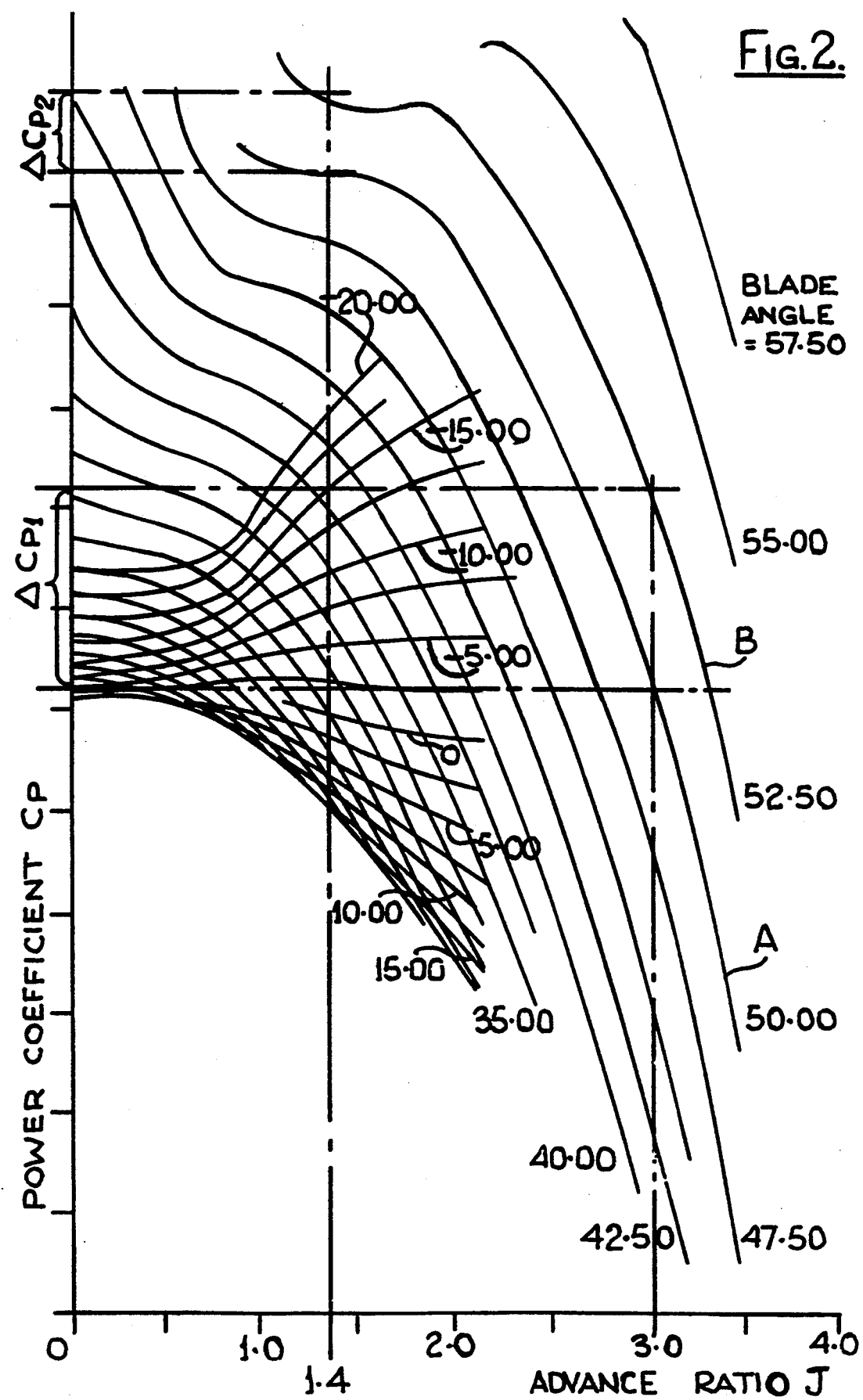

2

METHOD AND APPARATUS FOR SYNCHRONIZING THE SPEED AND PHASE OF PLURAL PROPELLERS OF AN AIRCRAFT

FIELD OF THE INVENTION

This invention relates to a method and apparatus for synchronizing the speed and phase of plural propellers of an aircraft.

BACKGROUND OF THE INVENTION

With existing forms of propeller control systems a compromise of the gains for speed, phase and beta control is made. Specifically, the gains are selected to produce a satisfactory stability margin for all operating conditions and in particular all airspeeds. This in fact results in lower gains being utilized than the gains which would produce optimum control.

Propeller synchrophasing systems serve to control the phase difference in the rotary motion of two propellers so as to maintain it at a desired phase difference. A phase sensor senses the phase difference between the two propellers and this is compared with a desired phase difference to produce a phase error signal. This error signal is then used to vary the relative speed of rotation of the propellers so as to adjust the phase difference between them until it matches the desired phase difference, at which point the error signal is zero. The rate of adjustment of the phase difference is determined by the gain of the system.

U.S. Pat. No. 5,093,791 discloses a propeller synchrophasing system of this known type in which the gain of the system is varied in accordance with the phase difference between the propellers so that there is a lower gain within a limited range of phase difference either side of zero error signal, and there is a higher gain outside of this range. The system is therefore more responsive to higher values of phase difference.

SUMMARY OF THE INVENTION

In accordance with the present invention a propeller control system suitable for use with an aircraft having at least two propellers includes a propeller controller having a control gain and means for varying the control gain in response to forward airspeed data.

By varying the propeller controller gain the overall system gain can be maintained at the ideal level as the airspeed changes. The airspeed data may be provided by a sensor remote from or associated with the system.

In effect, a propeller control system made in accordance with the present invention uses a technique called gain scheduling which is applied as a function of forward air speed to operate the necessary functions of the propeller control systems.

The propeller control system may be used to control phase, speed or act as a beta controller or any combination of these.

The gain controlled may be proportional, integral or differential gain or these gains in combination.

Preferably, the propeller control system includes an electronic propeller controller.

Alternatively, the electronic propeller controller may be built into the Full Authority Digital Electronic Controller FADEC or other controller.

In a preferred embodiment of the present invention the scheduling is achieved by mathematical algorithms built into the software of the electronic propeller controller.

Alternatively, the scheduling is achieved by providing set predetermined stored data between which interpolation is used.

Preferably, as a safety precaution in the event of a loss of the forward air speed data the electronic propeller controller defaults to a single set of gains/values selected as with conventional fixed term controllers.

BRIEF DESCRIPTION OF THE DRAWINGS

A specific embodiment of the invention will now be described, by way of example only, with reference to the drawings in which.

DETAILED DESCRIPTION OF THE INVENTION

Figure 1:
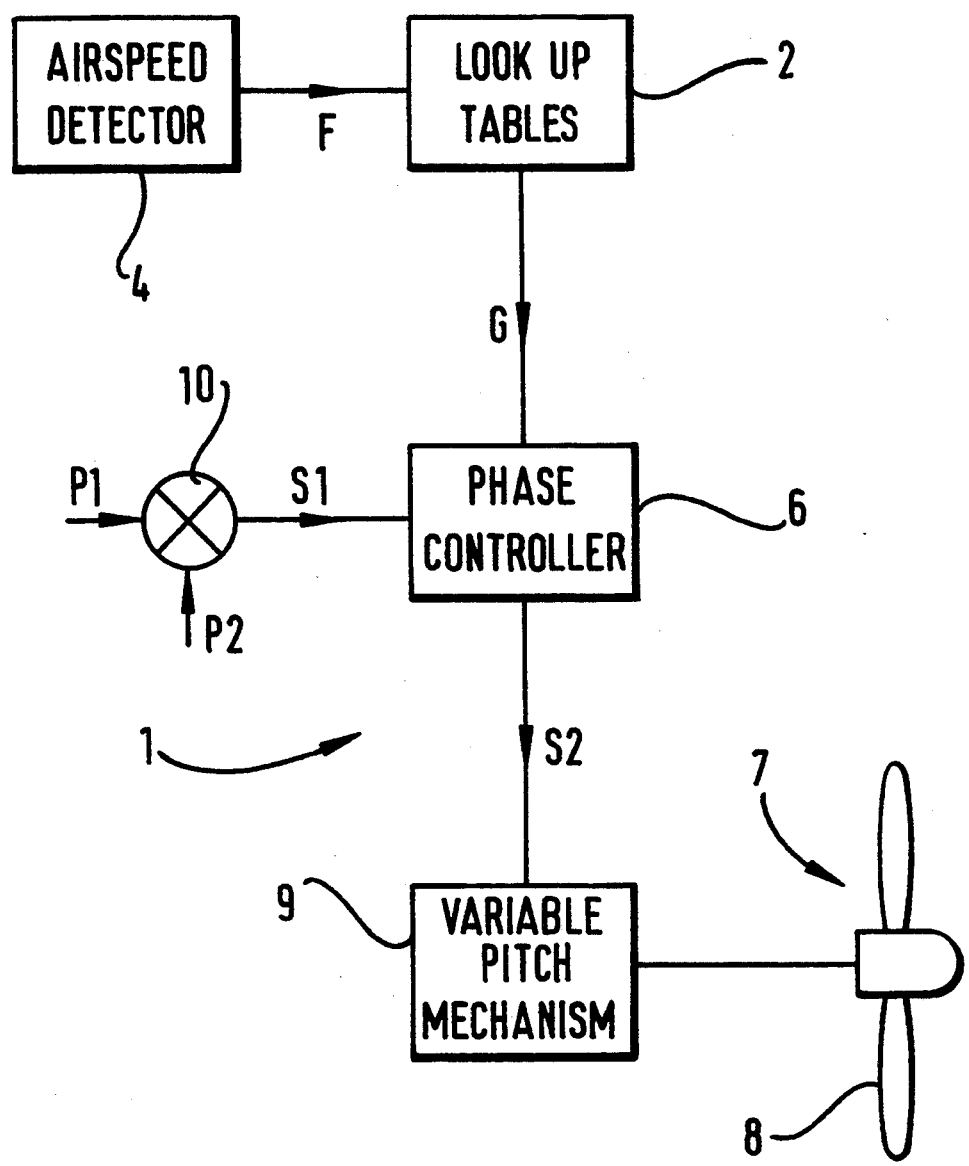
FIG. 1 shows in schematic form a propeller phase control system in accordance with the FIG. 2 shows the relationship of power coefficient and advance ratio for a propeller controlled by the control system shown in FIG. 1 at various blade pitch angles.

An aircraft propeller synchrophasing system 1 shown in FIG. 1 comprises monitor means 10 which monitors the phase difference between two propeller rotation signals P1 and P2 and produces a corresponding output signal S1, a phase controller 6 including a variable gain function to which the signal S1 is subjected to produce an output signal S2, and a variable pitch mechanism 9 which varies the pitch of one of the propeller blades 8 in accordance with the signal S2, thereby to maintain the propellers in the required phase relationship. Systems of this type are well known.

According to the present invention, however, a forward air speed detector 4 is located on the aircraft to sense its forward air speed and produce a forward air speed signal F. A store 2 contains values of gain against values of forward air speed in the form of a look-up table, and produces an output gain value G corresponding to the value of the forward air speed signal being applied to the store 2 at any one time. This gain value G is supplied to the phase controller 6 and determines the gain value used in the gain function which transforms signal S1 into signal S2.

It should be noted that due to the aerodynamic properties of propeller blades and their passage through the atmosphere the relationship between the power absorbed by the propeller and the angle of attack of the blade (blade angle) is not a linear relationship.

The relationship between the power absorbed by the propeller and the blade angle is dependent upon the advance ratio J, which states:

$$J = \frac{V}{nD}$$

where
$V$ = forward air speed
$n$ = revolution rate of the propeller
and
$D$ = diameter of the propeller The dominant variable in the advance ratio is the forward air speed of the aircraft.

The overall control system gain is dependent upon the gain of the phase controller 6 and the gain attributable to the propeller 7. The gain of the propeller 7 varies according to the advance ratio in a manner which will be described with reference to FIG. 2.

Consider curve A and B of the figure. Curve A shows the relationship of power coefficient to advance ratio for a blade pitch angle of 50° whilst curve B shows the relationship at an angle of 52.5°.

The Power Coefficient Cp is defined as:

$$Cp = \frac{P \times K}{p\, n^3 D^5}$$

where
P = power
K = constant
p = air density
n = revolution rate of the propeller
and
D = diameter of the propeller It can be seen that the vertical separation of the two curves varies with an increase in the advance ratio. This means that the difference in power coefficient is $\Delta Cp_1$ as the propeller pitch change angle varies from 50° to 52.5° at an advance ratio of 3.0 but is $\Delta Cp_2$ at an advance ratio of 1.4. A large change in the power coefficient corresponds to a large change in the power absorbed by the propeller with a corresponding large change of propeller speed. The propeller gain therefore varies as a function of the advance ratio.

The values of gains contained in the look up tables 2 reflect this variation according to the airspeed and compensate for it. When the airspeed is low a gain is selected which increases the gain of the phase controller 6 and hence maintain the overall system gain at a near ideal level. With an increase in airspeed the gain selected for the phase controller 6 will be lower compensating for the increase in gain attributable to the propeller 7 and hence maintaining the overall system gain.

In the event of loss of airspeed data the phase controller 6 will be set to a predetermined gain suitable for all airspeeds.

In alternative embodiments of the invention the propeller controller will be a speed or beta controller or a controller which controls these and the phase.

I claim:

1. A propeller control system for use with an aircraft having at least two propellers comprising a propeller controller comprising means for producing a first control signal corresponding to the motion of said propellers, said controller further comprising means that processes said first control signal using a variable gain to produce a second control signal suitable for adjusting the movement of at least one of the propellers, and an air speed sensor to sense the forward air speed of said aircraft and produce a forward air speed signal, said controller being responsive to said forward air speed signal to vary the gain of the controller in accordance with said forward air speed signal.

2. Apparatus as claimed in claim 1, which includes a store containing values of gain against values of forward air speed in the form of a look-up table, the controller selecting gain values from the store in accordance with values of the forward air speed signal and using these to process said first control signal.

3. Apparatus as claimed in claim 1, in which the controller selects a default gain from the store in the event of the absence of the forward air speed signal.

4. Apparatus as claimed in claim 1, which controls the phase of the propellers.

5. Apparatus as claimed in claim 1, which controls the speed of the propellers.

* * * * *